United States Patent [19]
Cunha et al.

[11] Patent Number: 5,636,439
[45] Date of Patent: Jun. 10, 1997

[54] METHODS FOR COATING AND SECURING MULTI-VANE NOZZLE SEGMENTS

[75] Inventors: Francisco J. Cunha, Schenectady; Iain R. Kellock, Clifton Park, both of N.Y.; George G. Gunn, Landrum, S.C.

[73] Assignee: General Electric Co., Schenectady, N.Y.

[21] Appl. No.: 446,151

[22] Filed: May 22, 1995

[51] Int. Cl.⁶ .................................................. B23P 15/00
[52] U.S. Cl. ................................ 29/889.22; 29/889.21
[58] Field of Search ........................... 29/889.2, 889.21, 29/889.22, 889

[56] References Cited

U.S. PATENT DOCUMENTS

| | | | |
|---|---|---|---|
| 4,602,412 | 7/1986 | Partington et al. | 29/889.22 |
| 4,827,588 | 5/1989 | Meyer | 29/889.22 |
| 5,174,715 | 12/1992 | Martin | 29/889.22 |

*Primary Examiner*—Irene Cuda
*Attorney, Agent, or Firm*—Nixon & Vanderhye

[57] ABSTRACT

Nozzle segments in the form of singlets having radial outer and inner walls with a single vane therebetween are coated with a base coat of nickel, chromium, aluminum and yttrium and prevent oxidation of the base metal. A finish coat of yttrium-stabilized zirconia is applied for anti-oxidation and anti-corrosion purposes. The singlets are welded to one another adjacent the abutting margins of the outer and inner walls. Electron beam welding is used to fuse the material of the walls together to a depth which does not penetrate the coating on the wall surfaces of the segments forming the hot gas path components of the turbine.

20 Claims, 4 Drawing Sheets

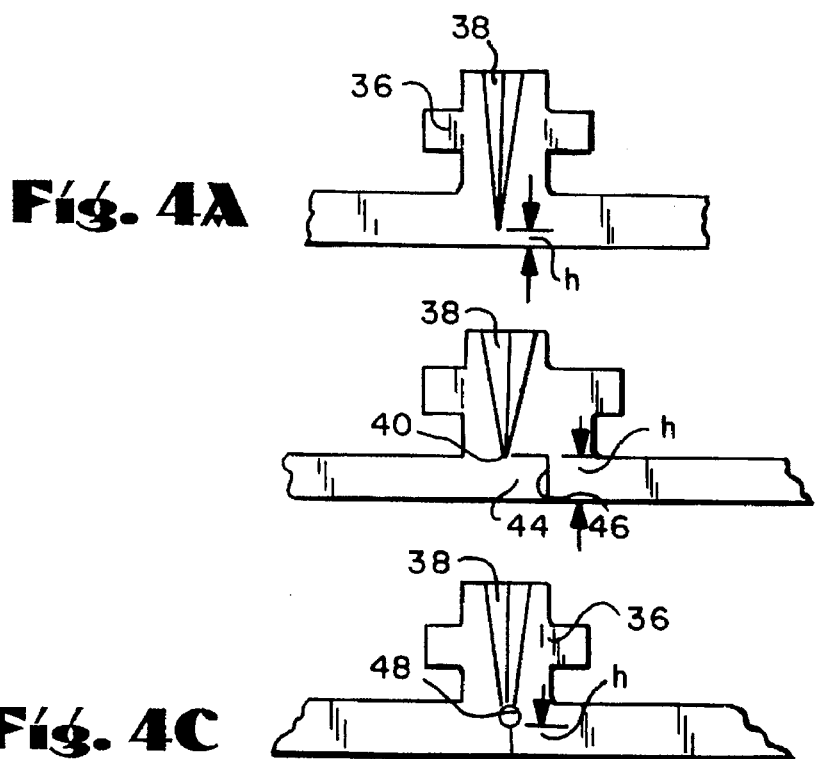
Fig. 4A
Fig. 4B
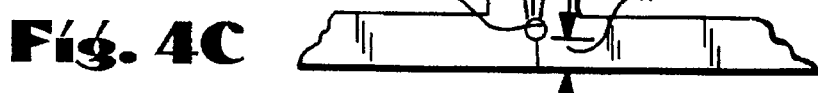
Fig. 4C
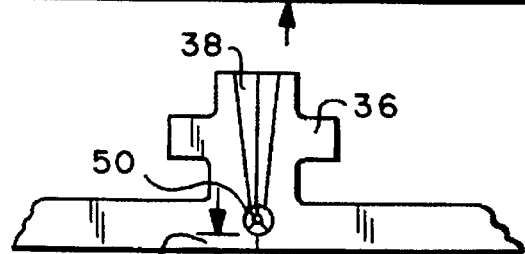
Fig. 4D
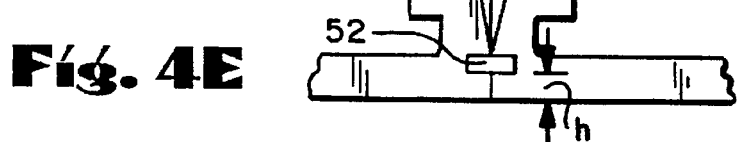
Fig. 4E
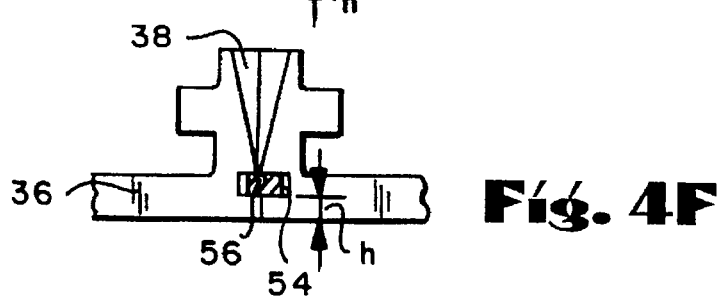
Fig. 4F

METHODS FOR COATING AND SECURING MULTI-VANE NOZZLE SEGMENTS

TECHNICAL FIELD

The present invention relates generally to land-based gas turbines, for example, for electrical power generation, and particularly to methods for applying coatings to nozzle segments and securing those nozzle segments to one another to form, in part, the hot gas path of the turbine.

BACKGROUND

Nozzle segments forming the stationary components for the hot annular gas path of a gas turbine typically have inner and outer walls between which are defined a plurality of circumferentially spaced vanes. Various methods are employed to cool the segments, including their inner and outer wall surfaces, as well as the surfaces of the vanes extending therebetween. For example, open-circuit air-cooling, or closed-circuit steam-cooling, or a combination of open-circuit air and closed-circuit steam-cooling may be used. In U.S. application Ser. No. 08/414,697, filed Mar. 31, 1995, entitled "Turbine Stator Vane Segments having Combined Air and Steam-Cooling Circuits," (Attorney Docket No. 839-354), there is disclosed an advanced gas turbine design having a plurality of nozzle segments disposed in annular arrays to form the stationary hot gas path components of respective first and second stages of a gas turbine. The complexities of the various multiple piping arrangements for supplying the cooling medium are such that it has been found desirable to manufacture the stationary components from a multiplicity of nozzle segments joined circumferentially to one another to form the annular array of stator vanes.

To improve overall performance and efficiency of the turbine, it has also been found desirable to provide a coating on the surfaces of the nozzle segments exposed to and defining the hot gas path. Such coating typically includes a base coat of an alloy comprising the elements nickel, chromium, aluminum and yttrium and which is applied to the base metal of the nozzle segments to provide resistance to oxidation and corrosion. On top of this base coating, there is applied a second or top coating of yttrium-stabilized zirconia having thermal insulating and anti-corrosion properties. These coatings are typically applied by a plasma spray head. However, only portions of the nozzle segments can be fully coated to the desired coating thicknesses and oftentimes portions of the nozzles are only coated with one or both of the coatings or remain uncoated. The non-uniformity of the applied coatings may result in substantial and undesirable temperature variations along the metal of the nozzles. The inability to properly coat the nozzle segments and to coat them to uniform thickness or depth along their hot gas path surfaces is a result of the physical size of the spray head and the complex configuration of the multi-vane nozzle segments. That is, the nozzle segments can be fabricated, e.g., integrally cast, in multi-vane segments having inner and outer walls with two, three or more vanes extending between the inner and outer walls, the segments thereby constituting doublets or triplets, as applicable, depending on the number of vanes in each segment. Because of the close spacing of the various portions of those nozzle segments, it has been found to be practically impossible to use a plasma spray head to apply coatings to all surfaces of the multi-vane segments or to uniformly coat these surfaces. In contrast, a single vane nozzle segment, i.e., a singlet wherein only a single vane extends between inner and outer walls, can be properly coated with the plasma spray head, ensuring a uniform coating on all hot gas path surfaces.

DISCLOSURE OF THE INVENTION

According to the present invention, there is provided a method of affording a uniform coating on the surfaces of nozzle segments defining the hot gas path when the segments are used as the stationary nozzles for a gas turbine by providing the nozzle segments in singlets, spray coating the singlets, and then securing the singlets one to the other to form doublets or triplets for subsequent disposition in an annular array thereof to form the stationary component of a stage of the turbine. More particularly, the present invention provides for the integral casting of nozzle segments in the form of singlets or as doublets, triplets, etc. If initially formed in units in excess of a singlet, the integral double or triplet castings are split to form singlets so that appropriate coatings can be sprayed onto the singlets uniformly along all of the hot gas path surfaces and to uniform depths. Each singlet can therefore be coated using the plasma spray head. Internal passages are differently coated with aluminide. Due to the nature of the small passages in the trailing edge cavity, a vapor deposition method may be used to coat the trailing edge cavity and passages. Thus, the hot gas path surfaces of each singlet can be coated with a bonding coat such as an alloy of nickel, chromium, aluminum and yttrium and thereafter coated with a yttrium-stabilized zirconia, both of which can be applied by an air plasma spray. The bond coat thickness may range between 5 and 8 mils to prevent oxidation penetration, while the top coat thickness may be up to 40 mils and serve as a thermal insulator and anti-corrosion coating.

After spraying the coatings onto the singlet, it is preferable to minimize the number of leakage paths between the adjacent segments, as well as to simplify the segment interface with external piping connections for flowing the cooling medium. That is, while singlets are preferable from the standpoint of the ability to spray coat the internal and external surfaces, they must, after the coating is applied, be joined to one another to form doublets, triplets, etc. to minimize leakage paths and to facilitate connections with external piping arrangements for flowing cooling medium. According to the present invention, a method has been developed for securing the singlets to one another to form doublets or triplets for final assembly in the hot gas path. Preferably, the surfaces to be joined, i.e., the adjacent margins of the adjoining outer and inner walls, are ground and placed in a fixture for electron beam welding. It is essential, however, that the coating on the hot gas path surfaces not be contacted during welding or penetrated or affected by the weld. It will be appreciated that electron beam welding focusses high energy on the areas to be welded to fuse the material of those areas together to form the weld. Thus, it is important that the electron beam as well as the fused material not penetrate through the coated surfaces of the nozzle segments exposed to the hot gas path. It is likewise important that the potential for crack development at the weld joint be minimized. Accordingly, the penetration of the electron beam and hence the fused material is limited to minimize crack formation while simultaneously preventing interference with or disruption of the bond coat. Consequently, according to the present invention, the fused material extends a distance less than 8 mils but greater than 1 mil from the coated hot gas path surfaces of the adjoining nozzle segments to prevent formation of a crack during the life of the turbine and interference with the coating, Stated differently, the non-fused portion of the butting margins of the segment walls extend a distance from the coated surfaces no greater than 8 mils to the fused material.

To further avoid the potential for crack formation, the abutting margins of the inner and outer walls of adjoining segments may be provided with complementary steps and recesses to reduce the tendency of opening a crack by allowing an artificial transverse crack orientation at the weld. Further, a hole may be cast in one or both of the adjoining margins of the nozzle segments to preclude propagation of a crack and to trap weld material in the hole so that the fused material does not penetrate to the hot gas path surfaces of the nozzle segments. Inserts may be used in the margins of the adjoining segments to position the parts in fixtures to ensure accurate welding.

In a preferred embodiment according to the present invention, there is provided a method of applying a surface coating to nozzle segments of a turbine having outer and inner walls connected to one another by a stator vane and securing the segments to form an annular path for flow of hot gases during operation of the turbine, comprising the steps of providing each nozzle segment as a singlet having an inner wall, an outer wall, and a single stator vane between the inner and outer walls, applying a base layer coating affording resistance to oxidation to surfaces of the inner and outer walls and the single stator vane of the singlet exposed in the hot gas path during turbine operation, applying a top coating to the base layer affording resistance to corrosion to all coated surfaces of the single inner and outer walls and stator vane of the singlet exposed in the annular hot gas flow path during turbine operation and securing the singlets to one another to form an annular turbine nozzle including by welding margins of adjacent inner walls of adjoining segments to one another and margins of adjacent outer walls of adjoining segments to one another.

In a further preferred embodiment according to the present invention, there is provided a method of applying a surface coating to nozzle segments of a turbine having outer and inner walls connected to one another by a stator vane and securing the segments to form an annular path for flow of hot gases during operation of the turbine, comprising the steps of forming each nozzle segment as at least a doublet having an inner wall, an outer wall, and at least a pair of stator vanes between the inner and outer walls, dividing each nozzle segment to form at least a pair of nozzle segment singlets having inner and outer wall portions and one stator vane therebetween, applying a coating to surfaces of the inner and outer wall portions and the one stator vane of each singlet to be exposed to the hot gas flow path during turbine operation and securing the singlets to one another to form at least doublets for location in an annular turbine nozzle including by welding margins of adjacent inner wall portions of adjoining singlets to one another and margins of adjacent outer wall portions of adjoining singlets to one another.

Accordingly, it is a primary object of the present invention to provide in a gas turbine novel and improved methods of substantially uniformly applying a thermal bond coating to the hot gas path surfaces of segments forming the stationary components of a gas turbine and securing the segments to one another such that the bond coating is not damaged or otherwise disrupted.

BRIEF DESCRIPTION OF THE DRAWINGS

FIGS. 4A–4F show various forms of the weld joint between adjacent singlets.

BEST MODE FOR CARRYING OUT THE INVENTION

Figure 1:
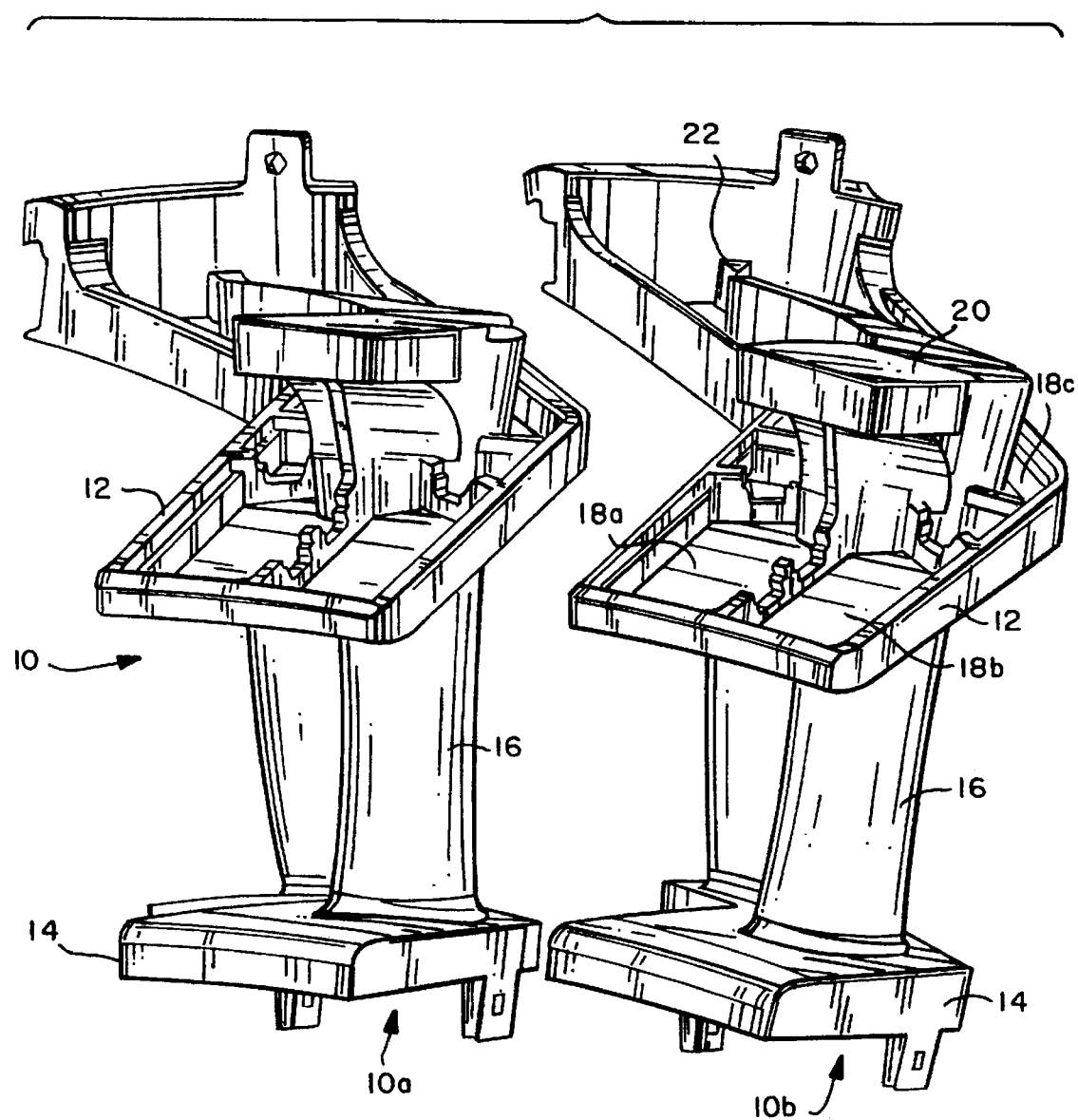
FIG. 1 is a perspective view illustrating a pair of nozzle segments spaced circumferentially one from the other and which segments comprise singlets which are individually coated.

Referring now to FIG. 1, there is illustrated a pair of nozzle segments, generally designated 10, each including a radial outer wall 12, a radial inner wall 14 and a curved stator vane 16 extending between the outer and inner walls 12 and 14, respectively. In FIG. 1, the nozzle segments 10 are disclosed as singlets 10a and 10b, i.e., a single stator vane 16 extending between outer and inner walls 12 and 14. In FIG. 1, it will be seen that the outer walls 12 are divided into a plurality of chambers 18a, 18b, 18c, etc. for receiving a cooling medium such as steam through a plenum 20, as well as for receiving air through an air inlet 22 whereby the outer and inner walls, as well as the vane, may be cooled. The inner walls 14 are also divided into plural chambers, not shown, affording part of a cooling steam return path. For particulars of the cooling system, reference is made to co-pending application Ser. No. 08/414,697, filed Mar. 31, 1995, entitled "Turbine Stator Vane Segments having Combined Air and Steam-Cooling Circuits," noted above. It will be appreciated that the singlets 10a and 10b can be formed, i.e., cast separately, or may be initially provided as doublets or triplets in a single casting and later separated to provide singlets in order that the nozzle segments can be spray coated. Absent providing the segments as singlets, coating all of the hot gas path surfaces desired to be cooled and applying a uniform coating to the segments is practically impossible by using currently available spraying techniques. That is, if applied to doublets or triplets, the coatings would be uneven, and would be of non-uniform depth. Additionally, portions of the segments would be left uncoated due to the impracticality of applying the spraying techniques to these complicated, complex structures. However, by forming singlets, either initially from castings or by cutting doublets and triplets into singlets, coatings may be applied to all desired surfaces and to the uniform depth.

Figure 2:
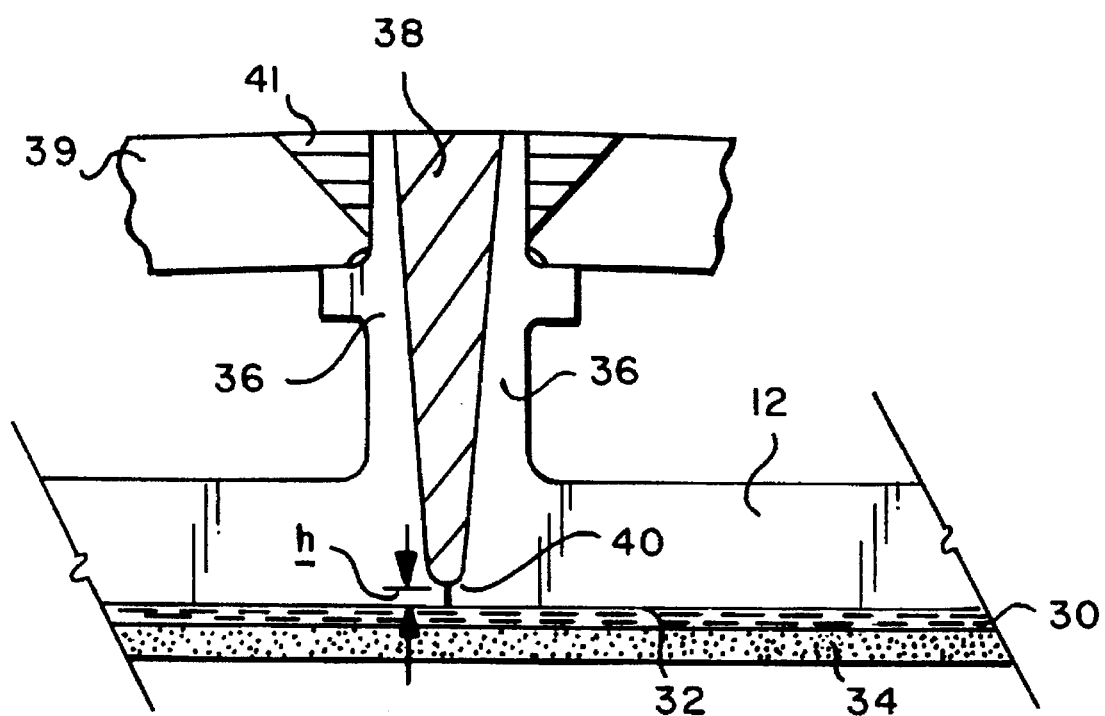
FIG. 2 is an enlarged fragmentary cross-sectional view illustrating the weld between adjacent margins of adjoining nozzle segments to one another.

A base coating, for example, as illustrated at 30 in FIG. 2, may be sprayed onto the hot gas path surfaces of outer wall 12, i.e., the inner wall surface 32 of outer wall 12. The base coat is preferably an alloy of nickel, chromium, aluminum and yttrium, is preferably applied to a thickness of between 5–8 mils, and prevents oxidation of the base metal. Over the base coating, there is provided a coating 34, preferably of yttrium-stabilized zirconia to a thickness on the order of 40 mils. All surfaces of the outer and inner walls 12 and 14 and the vane 16 in contact with the hot gas path can be spray-coated in this manner.

Figure 3:
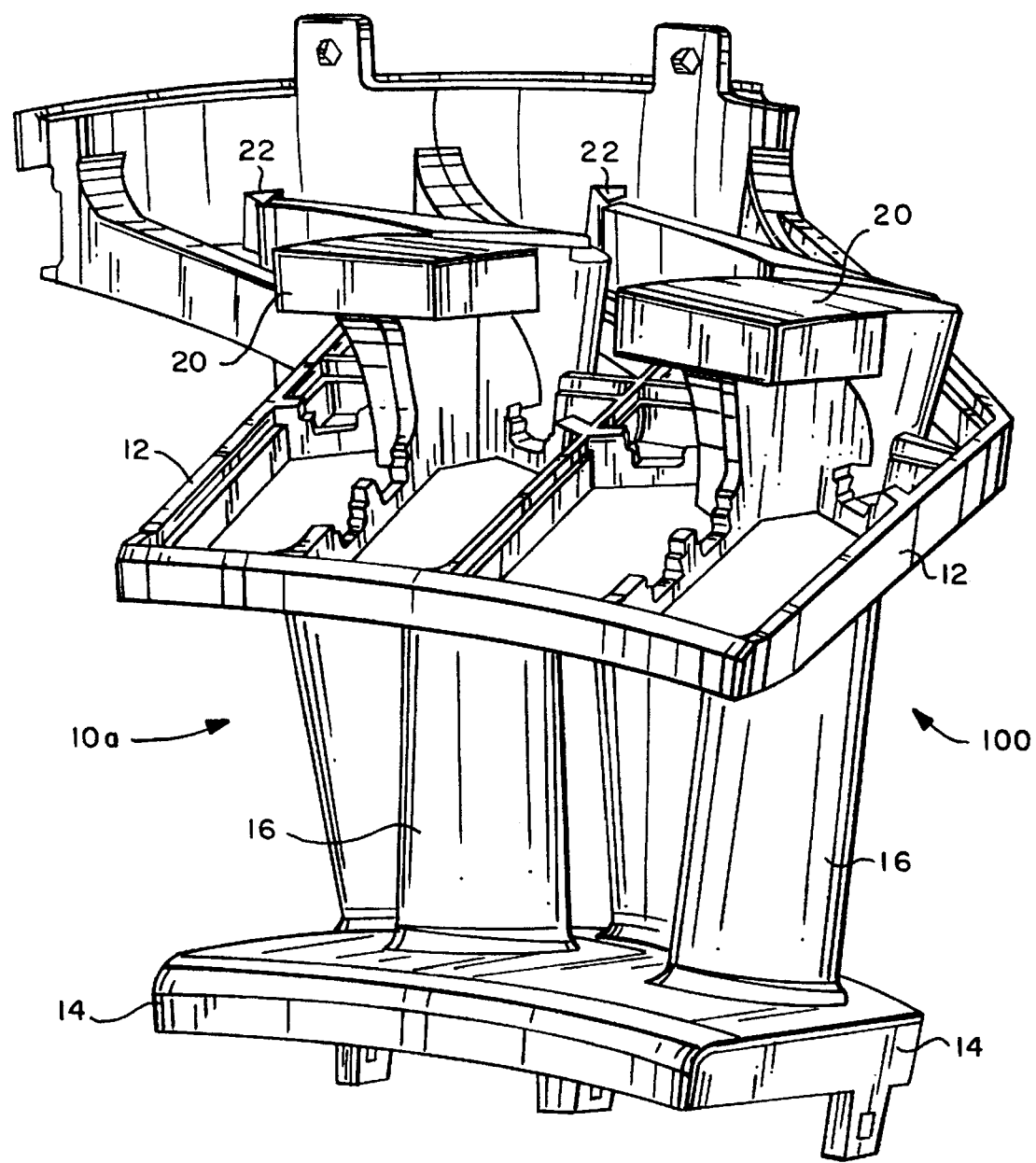
FIG. 3 is a view similar to FIG. 1 illustrating the singlets of FIG. 1 welded to one another to form a doublet.

In order to join the singlets to one another to form doublets or triplets for later installation as part of an annular array of nozzle segments for the stationary part of a gas turbine stage, a number of different techniques are employed to join the singlets one to the other. To secure the margins of the outer walls of adjoining segments, as well as the margins of the inner walls of the adjoining segments to one another, the margins are first ground. An electron beam welding technique is then applied to the margins of the segments to join the walls to one another. This is schematically illustrated in FIG. 2, wherein the fused material of the marginal walls 36 resulting from the electron beam welding is illustrated at 38. From a review of FIG. 2, it will be seen that the electron beam and hence the fused material 38 passes through substantially the entire depth of the walls 36 but terminates short of the base metal surface 32 of the walls 12 which will lie within the hot gas path of the turbine. A distance h is maintained between the apex 40 of the fused material and the surface 32. The butt joint between adjacent margins 36 is illustrated by the straight line between the apex 40 and surface 32 and spanning the distance h. In this manner, the surface coating comprised of the base layer 30 and top coat 34 and along the hot gas path is not disrupted or otherwise penetrated by the electron beam of the welding process. Preferably, the depth h in a radial direction is 8 mils or less and greater than 1 mil, to prevent that disruption as well as to prevent propagation of an opening or crack during the life cycle of the machine. That is, if the depth h is greater than 8 mils, there would be a potential for a crack to develop between the segments. Also, as illustrated in FIG. 2, cover plates 39 are TIG welded at 41 to the margins 36. FIG. 3 illustrates two singlets joined as described above to form a doublet.

The weld joint of FIG. 2 is again illustrated in FIG. 4A. In FIG. 4B, the potential for an artificial crack development is reduced by forming a step 44 and a recess 46 along the adjoining margins. The step 44 and recesses 46 are complementary to one another. Thus, the fused material 38 extends to the outer surface of the step 44.

In FIG. 4C, recesses 48 are formed in the facing margins of the nozzle segments 10a and 10b to form a hole for preventing crack propagation and trapping the weld material 38 during electron beam welding. Thus, the fused wall material does not extend beyond the hole toward the surface of outer wall 12. In FIG. 4D, an insert 50 has been provided in the hole to facilitate positioning of the parts relative to one another in a fixture, not shown, during electron beam welding.

In FIG. 4E, a rectilinear opening 52 is formed in the margins of the facing walls to prevent crack propagation and to trap weld material. In FIG. 4F, there is illustrated a similar rectilinear opening 54 with an insert 56 for facilitating fixturing the segments relative to one another during welding.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of applying a surface coating to nozzle segments of a turbine having outer and inner walls connected to one another by a stator vane and securing said segments to form a path for flow of hot gases during operation of the turbine, comprising the steps of:

(a) providing each nozzle segment as a singlet having an inner wall, an outer wall, and a single stator vane between said inner and outer walls;

(b) subsequent to step (a), applying a base layer coating affording resistance to oxidation to surfaces of said inner and outer walls and said single stator vane of said singlet exposed to the hot gas path during turbine operation;

(c) subsequent to step (b), applying a top coating to and overlying said base layer affording thermal resistance to all coated surfaces of said single inner and outer walls and stator vane of said singlet exposed in the annular hot gas flow path during turbine operation; and securing said singlets to one another including by welding margins of adjacent inner walls of adjoining segments to one another and margins of adjacent outer walls of adjoining segments to one another.

2. A method according to claim 1 wherein the base layer comprises an alloy of nickel, chromium, aluminum and yttrium and said top coating comprises yttrium-stabilized zirconia.

3. A method according to claim 1 including butting the margins of the inner walls of adjoining segments against one another and the step of welding includes fusing the material of the butting inner wall margins in a radial outward direction along said margins terminating short of said inner wall surfaces such that said inner wall surfaces and the base and top coatings therealong are not penetrated by fused material.

4. A method according to claim 3 including controlling the fusing of the material such that a depth of unfused material along said margins of less than 8 mils remains between the fused material and the inner wall surfaces of the inner walls.

5. A method according to claim 3 including forming an opening along one margin of said butting inner walls spaced radially inwardly of the inner wall surfaces, and welding said margins to one another with the fused material therealong terminating at said opening.

6. A method according to claim 3 including forming an opening along margins of said butting inner walls in registration with one another and aligning said butting walls with one another prior to welding thereof by placing an insert into said registering openings.

7. A method according to claim 3 including forming a complementary step and recess in the adjacent margins of said adjoining inner walls, and welding said margins to one another with the fused material extending radially outwardly terminating at said step and recess.

8. A method according to claim 1 including butting the margins of the outer walls against one another and the step of welding includes fusing the material of the butting outer wall margins in a radial inward direction along said margins terminating short of said outer wall surfaces such that said outer wall surfaces and the base and top coatings therealong are not penetrated by fused material.

9. A method according to claim 8 including controlling the fusing of the material such that a depth of unfused material along said margins of less than 8 mils remains between the fused material and the outer wall surfaces of the outer walls.

10. A method according to claim 8 including the step of forming an opening along one margin of said butting outer walls spaced radially outwardly of the outer wall surfaces, and welding said margins to one another with the fused material therealong terminating at said opening.

11. A method according to claim 8 including forming a complementary step and recess in the adjacent margins of said adjoining outer walls, welding said margins to one another with the fused material extending radially inwardly terminating adjacent said step and recess.

12. A method according to claim 8 including forming an opening along margins of said butting outer walls in registration with one another and aligning said butting walls with one another prior to welding thereof by placing an insert into said registering openings.

13. A method of applying a surface coating to nozzle segments of a turbine having outer and inner walls connected to one another by a stator vane and securing said segments to form an annular path for flow of hot gases during operation of the turbine, comprising the steps of:

forming each nozzle segment as at least a doublet having an inner wall, an outer wall, and at least a pair of stator vanes between said inner and outer walls;

dividing each nozzle segment to form at least a pair of nozzle segment singlets having inner and outer wall portions and one stator vane therebetween;

applying a coating to surfaces of said inner and outer wall portions and said one stator vane of each singlet to be exposed to the hot gas flow path during turbine operation; and securing said singlets to one another to form at least doublets for location in an annular turbine nozzle including by welding margins of adjacent inner wall portions of adjoining singlets to one another and margins of adjacent outer wall portions of adjoining singlets to one another.

14. A method according to claim 13 wherein the applied coating comprises a base layer affording resistance to oxidation, and including the further step of applying a top coating to said base layer affording thermal and corrosion resistance to a base coating surface.

15. A method according to claim 14 wherein the base layer comprises an alloy of nickel, chromium, aluminum and yttrium and said top coating comprises yttrium-stabilized zirconia.

16. A method according to claim 13 including butting the margins of the inner wall portions of adjoining singlets against one another and the step of welding includes fusing the material of the butting inner wall portion margins in a radial outward direction along said margins terminating short of said inner wall portion such that said inner wall portion surfaces and the coating therealong are not penetrated by fused material.

17. A method according to claim 16 including controlling the fusing of the material such that a depth of unfused material along said margins of less than 8 mils remains between the fused material and the inner wall surfaces of the inner wall portions.

18. A method according to claim 13 including forming an opening along one margin of said butting inner wall portions spaced radially inwardly of the inner wall portion surfaces, and welding said margins to one another with the fused material therealong terminating at said opening.

19. A method according to claim 13 including butting the margins of the outer wall portions against one another and the step of welding includes fusing the material of the butting outer wall portion margins in a radial inward direction along said margins terminating short of said outer wall portion surfaces such that said outer wall portion surfaces and the coating therealong are not penetrated by fused material.

20. A method according to claim 19 including controlling the fusing of the material such that a depth of unfused material along said margins of less than 8 mils remains between the fused material and the outer wall surfaces of the outer wall portions.

\* \* \* \* \*